Jan. 8, 1963 P. W. BALLES, JR 3,072,876
DETACHABLE CONNECTOR
Filed June 16, 1959

INVENTOR
PAUL W. BALLES, JR.

BY *William N. Barrett*
ATTORNEY

3,072,876
DETACHABLE CONNECTOR
Paul W. Balles, Jr., Endicott, N.Y., assignor to International Business Machines Corporation, New York, N.Y., a corporation of New York
Filed June 16, 1959, Ser. No. 820,703
1 Claim. (Cl. 339—108)

The present invention relates to a detachable electrical connector and in particular to a detachable electrical connector used as a test probe in establishing temporary connections between terminals of a device to be tested and a test instrument.

When circuits utilizing low voltage, low current devices, are to be tested it is apparent that high resistance connections or connections which vary in resistivity are undesirable and would contribute greatly to inaccuracy in the results of the tests.

The present invention provides a test probe which provides inherently a low resistance contact by virtue of the connection and further provides a means for insuring consistent values of contact resistance between probe and terminal. Combined with this feature of the invention is a lock-on action of probe to the terminal being tested to provide an apparatus which does not necessitate holding of the probe by the operator while testing and provides a constant pressure of contact tip to terminal. With this lock-on action, the instant invention provides for electrical isolation of the contact of the probe in a multiplurality of terminals to one specific terminal to be tested; while providing a guiding action to enable a connection to be made without unnecessary movement by the operator. While the present invention finds utility in the field of low voltage, low current circuitry, it is of course to be understood that this connector would also be highly desirable in any circuit connection. It is also to be understood that while the particular embodiment shown herein is adopted for use as a test probe, the invention relates to any type of connector.

It is therefore an object of this invention to provide an electrical connector for low resistance connections.

It is a further object of this invention to provide an electrical connector in which the parameters of connection are uniform.

It is another object of this invention to provide an electrical connector in which a lock-on action is provided for securing the connector to a terminal to be tested.

Another and further object of this invention is to provide an electrical connector for making contact to one terminal among many without electrical connection being made to any other.

The foregoing and other objects, features and advantages of the invention will be apparent from the following more particular description of a preferred embodiment of the invention, as illustrated in the accompanying drawing.

Figure 1:
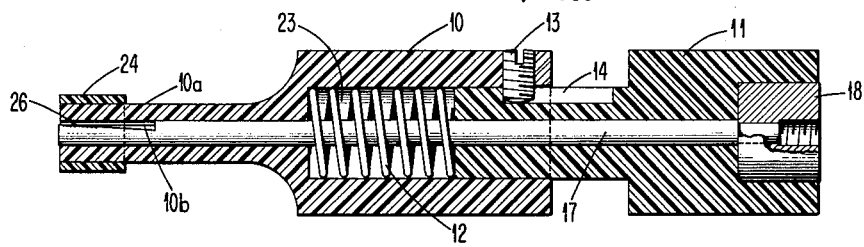
FIG. 1 is a sectional view of the invention.

In general, the connector is constructed so that the connector contact tip is shaped to complement the terminal with which it is to form an electrical connection. This provides for a large area of contact and limits the resistivity of the connection to the resistance of the smallest conducting link in the probe or terminal. This tip is recessed in a sleeve of insulating material having an inner portion of the sleeve opposite the tip which forces the terminal placed between tip and sleeve to be forced flat against the contact tip. Serrations are formed in the contact tip to interrupt any surface film to insure that all connections, whether made to terminals which have or do not have any surface film thereon, will exhibit constant parameters.

The connector probe consists of a nonconductive sleeve 10 and a nonconductive base 11 biased apart by a spring 12. A set screw 13 secured in the sleeve 10 and riding in a slot 14 in base 11 limits the relative movement of the sleeve and base.

Secured in the base 11 is an electrically conducting rod 17 formed of a suitable material, e.g., brass, and terminating in a threaded sleeve 18 formed integrally with the rod 17 or joined thereto by some suitable method, e.g., sweating, threading, etc. The threaded sleeve 18 provides the output from the connector to be joined to some cable originating from the test instrument. While the elements 10 and 11 are cylindrical, it is to be understood that this is a matter of choice. At the tip of the connector, a nonconductive sleeve 24 is provided having sufficient rigidity to prevent expansion of the extremity 10a of the sleeve 10. Any material having these necessary characteristics may be used, e.g., an epoxy resin.

Figure 2:
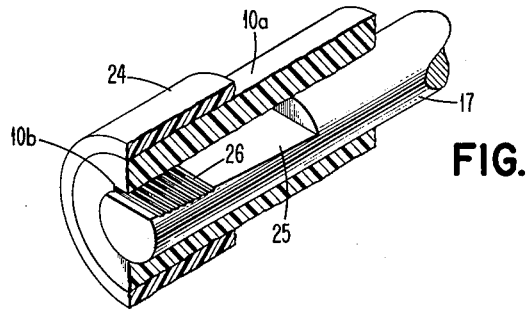
FIG. 2 is an isometric view, partially in section, of a portion of the invention.

In FIG. 2 the probe extremity 10a and the contact tip 25 of conducting rod 17 are shown in enlarged form. The contact tip 25 is shaped to complement the terminal to which it is to be attached. For a terminal having a flat side such as 30, FIGS. 3 and 4, the tip 25 would be flat. If the terminal was round, the contact would be concave. As mentioned previously, this provides for a low resistance connection as shown hereafter.

$$\text{Resistance} = \rho \frac{l}{A}$$

Where:

$\rho$—resistivity of the material
$l$—length of material
$A$—area of material

It is seen that by increasing the area of the connection the resistance is decreased to a low value so that the maximum value of resistance for connection will arise from the circuits themselves and not the probe. Furthermore, this extra large area of contact will provide for any high resistance irregularities in contact through the area. In other words, by providing a large area of contact, certain bad areas of contact therein may be ignored without introducing any errors.

Figure 4:
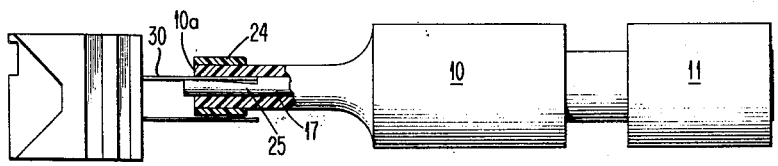
FIG. 4 is the connector of the present invention connected onto a terminal.

Formed in the surface of the contact 25 are knurled or etched serrations 26, exaggerated in the drawings for clarity. The function of these serrations is to penetrate any surface film or oxide coating formed on the terminals 30 in order to provide a metal to metal contact and insure that the parameters of resistance in each case are reduced below the limiting values of resistance found elsewhere in the test circuit. When a terminal 30, FIG. 4, is inserted into the connector and the connector is allowed to return toward a normal position there will be a relative movement between serrations 26 and terminal pin 30 to cause a biting or cutting action to obtain a metal to metal connection through any oxide or film on the terminal.

The contact tip is shaped as an inclined plane with the highest point being the extreme tip. At a point removed from the extreme tip, the distance between contact tip and peripheral surface 10b is less than the diameter of the terminal to be inserted. As shown in FIG. 4, the contact tip 25 will make a positive connection when the tip is extended beyond the sleeve 10a. This also provides a support for the terminal 30 outside the base of the sleeve 10 to insure that the terminals 30 will be contiguous with the contact tip 25.

The sleeve 10 is constructed of a resilient material, e.g., nylon, in the present instance. In the present particular example, the inclined plane was 3° from the parallel with the flat of the bore 10b. With this angle the deformation of the sleeve 10 when a terminal is inserted between contact tip and the periphery of the bore provides a force along a predetermined extent of the terminal to force the terminal into contact with the contact tip.

Applicant has, therefore, provided by virtue of the mechanical connection along a contact over a substantial area of the contact tip. Further, by virtue of the deformation of the sleeve 10, a positive force against the terminal itself will be exerted. The angle of the contact tip and the deformation of the sleeve will determine the extent of positive force exerted on the terminal.

Figure 3:
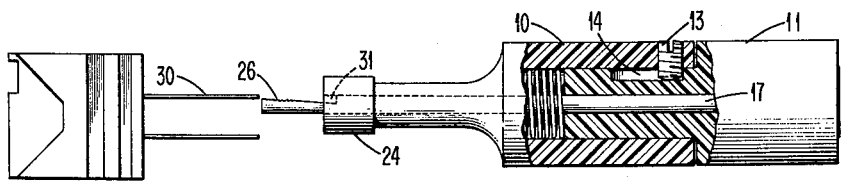
FIG. 3 is a side elevation, partially in section, of the invention and a series of terminals.

When the connector is to be used a connection is made to a terminal 30, FIG. 3, by extending the conducting tip 25 by moving the sleeve 10 relative to the base 11 which moves the tip 25 outside the bore 31. After contact of the terminal 30, the sleeve 10 is allowed to slide toward its unbiased position whereby the outermost tip slides over the contact terminal. This leaves the connector in a semipermanent position with respect to the terminal.

The guiding action of this probe, illustrated in an accentuated manner in FIG. 3, shows how by slightly extending the tip of the probe or tip of the conducting member the terminal to be attached is located so that a connection can be made. In practice it would not be necessary that the conducting rod be extended as far as shown in the drawing but only to the point wherein the terminal was adequately located. If it were desired, the tip of the sleeve 10 could be concave in order to locate the terminal without extending the probe tip. This feature of the invention allows for locating the proper terminal without hitting the other terminals and causing undesired circuits which might, in the proper instance, cause considerable damage by this connection.

While the invention has been particularly shown and described with reference to a preferred embodiment thereof, it will be understood by those skilled in the art that various changes in form and details may be made therein without departing from the spirit and scope of the invention.

What is claimed is:

An electrical connector for a terminal comprising: a relatively resilient sleeve; an electrically conducting cylindrical element having a diameter substantially the same as the inside dimension of the sleeve and slidably mounted in said sleeve; a contact tip formed on one end of said conducting element for connection with a terminal; said contact tip being shaped as an inclined plane with the high point of said plane at the end of said cylindrical element and being inclined toward the axis of said conducting element; means for normally biasing said conducting element to urge said inclined plane of said tip within said sleeve whereby an opening is formed between the inside diameter of the sleeve and the inclined plane which increases in magnitude as the conducting element is moved out of said sleeve; whereby a terminal placed in said opening when said conducting element is extended is wedged between said contact tip and said resilient sleeve as the conducting element resumes a normal position within said sleeve.

References Cited in the file of this patent

UNITED STATES PATENTS

| | | |
|---|---|---|
| 1,023,706 | Anderson | Apr. 16, 1912 |
| 1,165,273 | Miller | Dec. 21, 1915 |
| 1,359,324 | Bullock | Nov. 16, 1920 |

FOREIGN PATENTS

| | | |
|---|---|---|
| 248,614 | Switzerland | Feb. 16, 1948 |